(12) United States Patent
Bornet et al.

(10) Patent No.: US 10,230,138 B2
(45) Date of Patent: Mar. 12, 2019

(54) DEVICE AND METHOD FOR MAINTAINING A BATTERY AT AN OPERATING TEMPERATURE

(71) Applicant: VALEO SECURITE HABITACLE, Créteil (FR)

(72) Inventors: Christophe Bornet, Créteil (FR); Carlos Pintos, Créteil (FR)

( * ) Notice: Subject to any disclaimer, the term of this patent is extended or adjusted under 35 U.S.C. 154(b) by 58 days.

(21) Appl. No.: 14/404,974

(22) PCT Filed: Jun. 4, 2013

(86) PCT No.: PCT/EP2013/061515
§ 371 (c)(1),
(2) Date: Dec. 2, 2014

(87) PCT Pub. No.: WO2013/182575
PCT Pub. Date: Dec. 12, 2013

(65) Prior Publication Data
US 2015/0132612 A1 May 14, 2015

(30) Foreign Application Priority Data
Jun. 4, 2012 (FR) .................................... 12 01605

(51) Int. Cl.
*H01M 10/625* (2014.01)
*H01M 10/633* (2014.01)
(Continued)

(52) U.S. Cl.
CPC ....... *H01M 10/625* (2015.04); *H01M 10/615* (2015.04); *H01M 10/63* (2015.04);
(Continued)

(58) Field of Classification Search
CPC .......... H01M 10/633; H01M 10/6571; H01M 10/5016; H01M 10/502; H01M 10/5006; H01M 10/486; H01M 220/20
(Continued)

(56) References Cited

U.S. PATENT DOCUMENTS 6,002,240 A 12/1999 McMahan et al.
2002/0105443 A1* 8/2002 Flick ...................... B60R 25/04
340/988

(Continued)

FOREIGN PATENT DOCUMENTS

EP 2 410 591 A1 1/2012
EP 2 413 455 A1 2/2012
(Continued)

OTHER PUBLICATIONS

International Search Report for corresponding International Application No. PCT/EP2013/061515, dated Jun. 26, 2013 (5 pages).
(Continued)

*Primary Examiner* — Gary D Harris
(74) *Attorney, Agent, or Firm* — Osha Liang LLP

(57) ABSTRACT

The invention relates to a device and method for maintaining a battery at an operating temperature. Said device for maintaining a first battery at an operating temperature is characterized in that it comprises: a heating circuit (140) capable of heating the first battery; and a monitoring circuit (200) connected to the heating circuit, the monitoring circuit being capable of controlling the operation of the heating circuit according to predetermined programming.

10 Claims, 2 Drawing Sheets

Figure 1:
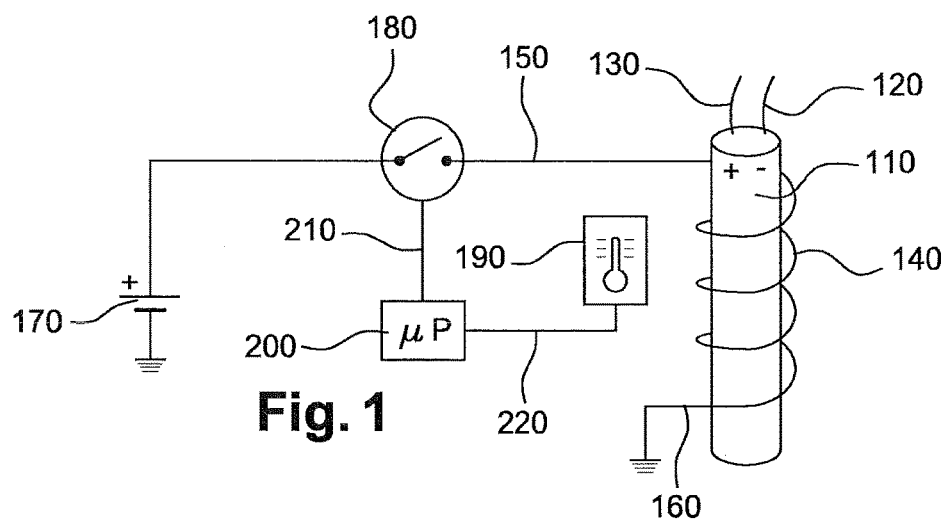

(51) Int. Cl.
  *H01M 10/6571* (2014.01)
  *H01M 10/63* (2014.01)
  *H01M 10/615* (2014.01)
  *H01M 10/48* (2006.01)

(52) U.S. Cl.
  CPC ..... *H01M 10/633* (2015.04); *H01M 10/6571* (2015.04); *H01M 10/486* (2013.01); *H01M 2220/20* (2013.01)

(58) Field of Classification Search
  USPC ........................................ 429/7, 50
  See application file for complete search history.

(56) References Cited

U.S. PATENT DOCUMENTS

| | | | |
|---|---|---|---|
| 2005/0264257 A1 | 12/2005 | Inui | |
| 2008/0036425 A1* | 2/2008 | Tashiro | H01M 10/486 320/154 |
| 2008/0213652 A1* | 9/2008 | Scheucher | B60L 8/00 429/62 |
| 2011/0144861 A1* | 6/2011 | Lakirovich | H01M 10/443 701/36 |
| 2012/0295142 A1* | 11/2012 | Yan | H01M 6/5038 429/62 |

FOREIGN PATENT DOCUMENTS

| | | |
|---|---|---|
| KR | 10-2012-0125002 A | 11/2012 |
| WO | 99/31752 A1 | 6/1999 |

OTHER PUBLICATIONS

Search Report for French Application No. 1201605, dated Apr. 3, 2013 (5 pages).

* cited by examiner

DEVICE AND METHOD FOR MAINTAINING A BATTERY AT AN OPERATING TEMPERATURE

The subject matter of the invention is a device and a method for maintaining a battery at an operating temperature.

The field of the invention is that of in-vehicle embedded devices.

More precisely, the field of the invention is that of stand-alone in-vehicle embedded devices and more particularly the power supply of these devices.

With the increasing accessibility of new information and communication technologies in all fields, there is today great interest in in-vehicle telematics. In-vehicle embedded telematics includes, inter alia, the long-distance transmission of information between two intelligent devices. One part of embedded telematics consists in supplying relevant information to a user of a vehicle. Another part of embedded telematics consists in ensuring optimum safety conditions for the user of the vehicle. This safety is at least double through taking into account the risks inherent in the normal use of the vehicle and through taking into account societal risks. One risk in the normal use of the vehicle is that of accidents. One societal risk is theft. This is a non-restrictive example. These risks are taken into account by 'standalone' devices in the sense that they do not have to depend on the integrity of the vehicle for being able to operate.

Accidents are taken into account by an embedded device for automatically reporting an accident. The principle of such a device is, once the accident detected, to send an e-mail reporting the accident to a specialized receiver. The e-mail comprises at least the location of the accident, i.e. the location of the transmitting device. This reduces the time elapsing between the accident and the arrival of the emergency services at the site of the accident.

The e-mail reporting the accident is sent automatically, following the detection of the accident by sensors, or manually following activation, via an actuator, by a user of the vehicle whether or not the vehicle has suffered damage. The embedded device obtains the location to be included in the message transmitted, for example, via a satellite positioning system.

The societal risk is taken into account by a vehicle tracking device. These device are most often called SVT (Stolen Vehicle Tracking) devices. Such a tracking device transmits, continuously or on demand, the position of same. The transmitted position is obtained as for the automatic accident reporting device.

More generally the terms used are safety devices and security devices. Safety devices make the normal use of the vehicle safer by reducing the effects of hazards of use as much as possible. But prevention is more effective than reduction. Security devices attempt to reduce the effects of willful violations of vehicle integrity.

Clearly the availability of such safety devices or such security devices cannot depend on the availability of a main power supply of a vehicle. Indeed, it is relatively easy to disable such a main power supply:

Disconnection on impact during an accident,
Deliberate act of cutting cables aimed at cutting off the power supply to a security device,
etc.

For at least these reasons safety devices and security devices always comprise a backup battery that gives them a degree of autonomy when they are cut off from a main power supply source of a vehicle that they secure.

Insofar as these safety and security devices are embedded in a vehicle, they must comply with the standards in force in their field of application. In this case there is a temperature range in which these safety and security devices must operate. This range extends from −40° C. to +85° C.

The problem arises at low temperatures. Below −20° C. it is known that standard batteries hardly deliver any more current. The devices dependent on these batteries are thus inoperative. Insofar as these devices are used when the vehicle is in operation and are located either in the engine compartment, or in the passenger compartment they are rarely subjected to extremely low temperatures. In the particular case of security devices they must, however, be able to operate even when the vehicle is not in operation, i.e. when its engine is switched off. In this case the operating temperature of the security device is the ambient temperature of the place where the vehicle is located. In this case the vehicle and its components do not contribute any calories to the security device.

A variant of the problem occurs even when the vehicle is started, in fact when the vehicle has just started up and the vehicle components have not yet risen in temperature. An accident or illness may yet occur during the first wheel revolutions. Safety devices should therefore be active as fast as possible.

The invention solves these problems by monitoring the temperature of a battery powering the security device. The battery is therefore coupled to a temperature sensor and a heating device. The heating device and the temperature sensor are connected to a microcontroller which controls the heating device according to the signals produced by the temperature sensor. The microcontroller switches on the heating device so as to maintain the battery at a temperature at which it is capable of operating, i.e. of delivering energy. Such a temperature is higher than −20° C.

The subject matter of the invention is therefore a device for maintaining a first battery at an operating temperature characterized in that it comprises:
  a heating circuit suitable for heating the first battery
  a control circuit connected to the heating circuit, the control circuit being suitable for controlling the operation of the heating circuit in accordance with determined programming.

In addition to the main features which have just been mentioned in the preceding paragraph, the device according to the invention may have one or more of the following additional features, considered individually or according to technically possible combinations:
  it comprises:
  a temperature sensor (190) suitable for measuring the temperature of the first battery, said sensor being connected to the control circuit, the determined programming being based on a measurement of the temperature of the first battery.
  the heating device is powered by a second battery.
  it comprises a switching circuit for selecting the power supply of the heating circuit from:
  the first battery,
  the second battery.
  the heating device is powered by the first battery.
  the heating circuit is a resistive cable winding arranged about the first battery.
  the heating circuit is composed of two coils arranged on each side of a location intended to receive the first battery.
  the temperature sensor is thermally insulated from the heating circuit.

The subject matter of the invention is also a method for implementing a device for maintaining a battery at an operating temperature characterized in that it comprises the following steps:
at the start-up of the control circuit, switching on the heating circuit for a specified period.

The subject matter of the invention is also a method of implementing a device for maintaining a battery at an operating temperature characterized in that it comprises the following steps:
acquisition the temperature of the first battery at a first predetermined frequency
comparison of the acquired temperature with a predetermined threshold:
if the acquired temperature is below the threshold then the heating circuit is switched on.

In addition to the main features which have just been mentioned in the preceding paragraph, the method according to the invention may have one or more of the following additional features, considered individually or according to technically possible combinations:
it comprises the following step:
if, during the comparison the acquired temperature is above the threshold, then the heating circuit is shut down.
it comprises the following step:
shutdown of the heating device at a second predetermined frequency.

The invention will be better understood on reading the following description and examining the accompanying figures. These are given as a guide and are in no way restrictive of the invention. The figures show:

FIG. 1: an illustration of a first implementation of the invention.

Figure 2:
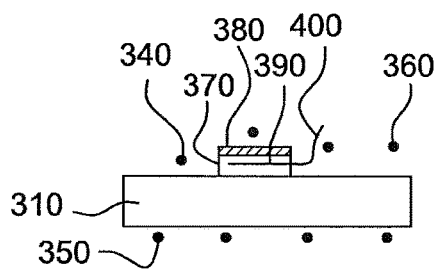

FIG. 2: an illustration in longitudinal section of a first battery implemented in a device according to the invention.

Figure 3:
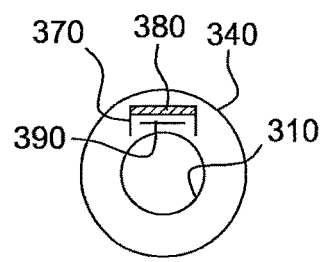

FIG. 3: an illustration in lateral section of a first battery implemented in a device according to the invention.

Figure 4:
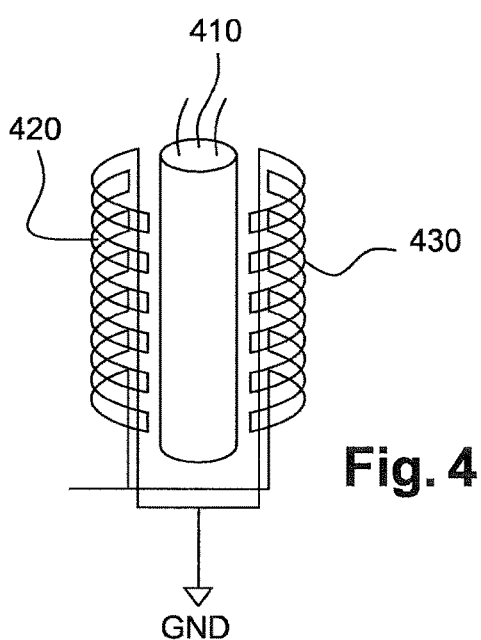

FIG. 4: an illustration of a variant implementation of a heating device.

Figure 5:
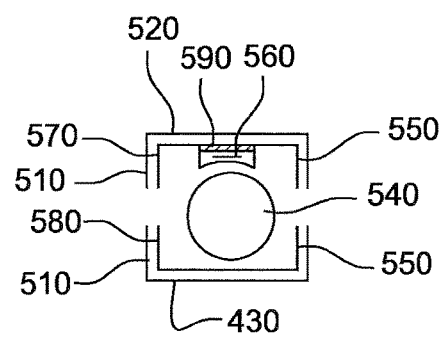

FIG. 5: an illustration of a variant implementation of a battery heating device.

Figure 6:
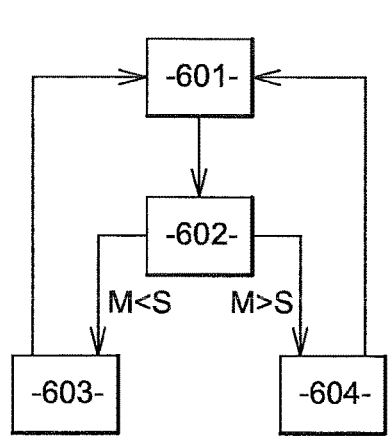

FIG. 6: an illustration of steps of the method according to the invention.

Figure 7:
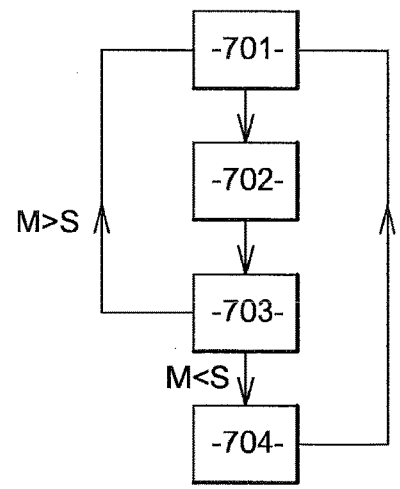

FIG. 7: an illustration of steps of the method according to the invention.

Figure 8:
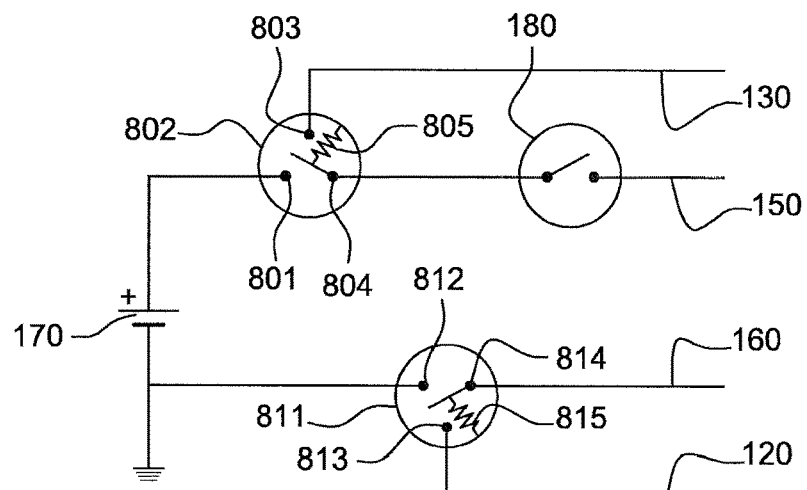

FIG. 8: an illustration of a variant of the invention.

Figure 9:
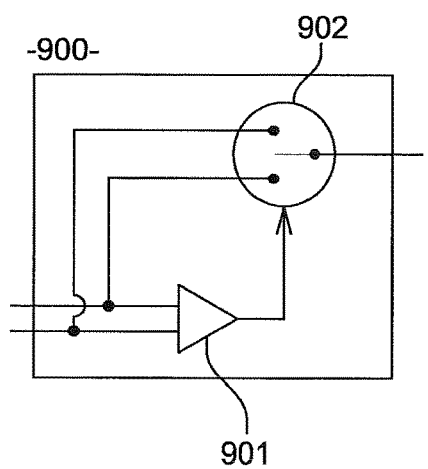

FIG. 9: an illustration of a power supply selection circuit.

FIG. 1 shows a first battery 110 comprising power supply cables 120 and 130 for connecting the first battery 110 to a safety device or to a security device not shown.

FIG. 1 also shows a heating circuit 140 consisting of a resistive cable wound about the first battery 110. When the circuit 140 is traversed by an electric current it generates heat by the Joule effect. Insofar as the heating circuit 140 is very close or in contact with the first battery 140, it is heated when the heating circuit 140 generates heat.

FIG. 1 shows that the heating circuit 140 is connected, via power supply cables 150 and 160 to a second battery 170. This connection is made via a switching device 180. Such a switching device 180 is, for example, and non-restrictively, an electromechanical switch, a transistor, a relay, or any equivalent device. The implementation of the device 180 can be used to open or close the power supply circuit of the heating circuit 140.

FIG. 1 also shows a temperature sensor 190. Such a sensor is a thermistor, a thermocouple or any other equivalent device. It is assumed that the temperature sensor 190 is suitable for measuring the battery temperature at least in the following cases:
The temperature sensor is in direct contact with the battery
The temperature sensor is in contact with the battery via at least one heat conductive material
The temperature sensor is sufficiently close to the battery so that the elements between the sensor is the battery do not constitute a thermal insulation.

In a variant the relative positioning of the temperature sensor with respect to the battery is taken into account for calibrating temperature measurement. In one case a correction factor is applied to the measurement performed by the temperature sensor.

FIG. 1 also shows a control circuit 200. The control circuit 200 is of the microcontroller or microprocessor type. The control circuit 200 is connected to the switching device 180 via a cable 210 and the temperature sensor 190 via a cable 220. The cable 220 enables the microcontroller 200 to receive temperature measurements produced by the temperature sensor 190. The cable 210 enables the control circuit 200 to control the switching device 180.

With regard to the cables it is understood that these are a means of conveying an analog, power or digital electrical signal. As such these cables are either cables or tracks on a printed circuit, or both.

FIG. 2 shows an example of implementation of a first battery of the type of the battery 110. FIG. 2 thus shows a battery 310 surrounded by a resistive cable 340.

FIG. 2 shows, between the cable 340 and the battery 310 a receptacle 370 of which the upper part 380 in contact with the cable 340 is thermally insulating. The receptacle 370 receives a temperature sensor 390 equivalent to the sensor 190. The sensor 390 is connected to a control circuit via a cable 400. Either the receptacle 370 comprises an orifice for allowing the cable 400 to pass through, or the cable 400 passes between the receptacle 370 and the battery 310.

FIG. 3 is a lateral section, at the level of the sensor 390, of the device illustrated in FIG. 2. FIG. 3 illustrates the facts that:
The receptacle 370 is between the cable 340 and the battery 310,
The receptacle 370 is:
Either open on the battery side for enabling the sensor to be in contact,
Or, on the battery side, equipped with a heat conductive wall.

The variant in FIG. 2 can be used to thermally insulate the temperature sensor of the heating circuit for providing a temperature measurement closest to the actual temperature of the battery.

Another variant of the invention is implemented without the receptacle 370.

FIG. 4 shows a first battery 410 surrounded by two networks 420 and 430 of coils made of resistive cable. The networks 420 and 430 are located on each side of the battery 410 and do not intersect. The networks 420 and 430 have the same power supply. It is then possible to move the networks 420 and 430 apart for placing and/or replacing the battery 410.

In the variant in FIG. 4 the temperature sensor, not shown, is either attached to the battery 410, or attached to one of the two networks 420 or 430.

FIG. 5 illustrates a housing 510 in two parts 520 and 530 suitable for containing, once closed, a first battery 540. Once the housing is closed the following are accessible:

Two power cables by which the battery 50 delivers the electrical energy that it contains Two power supply cables for powering a heating device 550, and A connecting cable 560 of a temperature sensor.

The inner walls of part 520 and part 530 are covered with resistive films 570 for part 520 and resistive films 580 for part 530. These resistive films are supplied by the two power supply cables.

The sensor 560 is:

Either attached to one of the two parts 520 or 530,

Or to the interior of a receptacle 590 itself attached to one of the two parts 520 or 530.

The fact that the sensor 560 or the receptacle 590 is attached is optional. It suffices that the sensor 560 or the receptacle 590 is inside the housing 510 once it is closed.

The receptacle 560 is equivalent to the receptacle 370. According to the variant of the invention the receptacle 560 optionally comprises an insulating wall for insulating the temperature sensor 560 of the heating device 550.

In a variant of the invention, not shown, a temperature sensor is, by construction of the first battery, inside said first battery. This is particularly easy if said battery is composed of several capacitive elements. An element is said to be capacitive if it is suitable for storing electrical energy.

In one variant of the invention the cable 130 is connected to the switching device 180 instead of the battery 170. The cable 130 is connected to the terminal of the device 180 to which the cable 150 of the heating circuit 140 is not connected. In this variant the cable 120 is connected to the cable 160. In this configuration the first battery 110 is capable of powering the heating circuit 140 using the energy of the first battery 110. This power supply is controlled by the control circuit 200 via the switching device 180.

FIG. 8 shows a selection device 801 comprising by naming convention, a first input 802, a second input 803 and an output 804. The input 802 is connected to the positive pole of the second battery 170. The input 803 is connected to the positive pole of the first battery 110, i.e. to the cable 130. The selection device 801 is therefore used to connect the terminal 804 either to the positive pole of the first battery 110, or to the positive pole of the second battery 170. The output 804 is connected to a terminal of the switching device 180, the other terminal of the device 180 being connected to the cable 150.

FIG. 8 also shows a selection device 811 comprising a first input 812, a second input 813 and an output 814. The input 812 is connected to the positive pole of the second battery 170. The input 813 is connected to the positive pole of the first battery 110, i.e. to the cable 130. The selection device 811 is therefore used to connect the terminal 814 either to the negative pole of the first battery 110, or to the negative pole of the second battery 170. The output 814 is connected to the cable 160.

The selection made by the device 801 and the device 811 is performed consistently. This means that the link between the input terminal 802 and the output terminal 804 is selected at the same time as the link between the input terminal 812 and the output terminal 814. In one implementation, at rest, i.e. without power, the active links are the link between the input terminal 803 and the output terminal 804, and the link between the input terminal 813 and the output terminal 814. This is achieved, for example, by elastic means 805 for the device 801 and by elastic means 815 for the device 811. When they are powered, by the second battery 170, the link between input terminal 802 and the output terminal 804 and the link between the input terminal 812 and the output terminal 814 are activated by electromagnetic fields whereof the actions oppose the action of the elastic means 805 and the action of the elastic means 815. If the link with the second battery 170 disappears, then the elastic means 805 and the elastic means 815 restore the link between the input terminal 803 and the output terminal 804 and the link between the input terminal 813 and the output terminal 814. There is therefore an automatic switchover, for the power supply of the heating device 110, between the first and second batteries.

The elastic means 805 and 815 are, for example, and non-restrictively, elastic bands, springs, a shape memory strip, etc. A purely electrical device may also be used as a selection device.

Such a device is, for example, a changeover switch controlled by a comparator such the device 900. FIG. 9 shows a comparator 901 one of the inputs of which is connected to the positive terminals of the first battery, the other to the positive terminal of the second battery. FIG. 9 also shows a changeover switch 902 one of the inputs of which is connected to the positive terminals of the first battery, the other to the positive terminal of the second battery. The output of the changeover switch 902 is connected to a terminal of the switch 180. An output of the comparator 901 controls the changeover switch 902. The device 900 may be used instead of the device 801.

For the description of the implementation method variants of the invention actions are executed by a microcircuit, microprocessor, microcontroller or equivalent circuit. These actions are the result of the interpretation, by said circuit, of instruction codes recorded in a program memory of said circuit, not shown.

FIG. 6 shows a step 601 in which the control circuit 200 acquires the temperature of the battery 110. According to the nature of the temperature sensor 190, this acquisition consists in reading an analog or digital signal produced by the temperature sensor 190. If it is an analog signal it is converted into a digital signal. This measurement will be referred to subsequently as the measurement M.

Once the measurement M has been acquired the control circuit 200 proceeds to a step 602 in which it compares the measurement M to a threshold S. The threshold S is recorded in a memory of the control circuit 200 or in a memory, not shown, connected via a bus to the control circuit 200.

The threshold S is a parameter of the method. It is either set by construction, or programmable via an interface provided for this purpose.

If the measurement M is below the threshold at S then the control circuit 200 proceeds to a step 603 of switching on the heating circuit 140, or keeping same switched on. To do this, the control circuit 200 sends a switching signal to the switching device 180 for powering the heating circuit 140.

If M is above S then the circuit 200 proceeds to a step 604 of switching off the heating circuit 140, or keeping same switched off.

From step 603 and step 604 the control circuit 200 proceeds to step 601. In step 601 the control circuit 200 waits for the elapse of a predetermined time T before acquiring and taking into account a new temperature measurement as previously described.

The period T is a parameter of the method. It is either set by construction, or programmable via an interface provided for this purpose.

In a variant implementation, in a step 701 the control circuit 200 evaluates the elapsed time since the last switching on. If this time is greater than a time TA then the control circuit 200 proceeds to a step 702 of switching off the heating circuit 140, or keeping same switched off. The heating device is therefore shut down at a second predetermined frequency. This frequency is the inverse of the time period TA. It is a maximum frequency since for shutting down it is necessary that the heating device is switched off. As the heating device is only switched on in case of low temperature, the frequency corresponding to the time TA is only reached in case of low temperatures. By misuse of language the maximum attainable frequency is equated with the operating frequency.

It is known that all control circuits are associated with a clock. A time interval is measured via a counter which is incremented by one at each clock beat. When the counter reaches a certain number, this corresponds to a certain time. There is therefore an equivalence between a value CA that a counter has to reach and the time TA. In this variant, the control circuit 200 therefore comprises a counter corresponding to a memory area accessible for reading and writing. At each beat of the clock this counter C is incremented by one. In practice it may be a multiple of the clock frequency. This result is conventionally achieved via interrupts handled in the control circuit.

From step 702 the control circuit 200 proceeds to a step 703, equivalent to step 601, in which it acquires the temperature of the battery 110.

If the measurement M, temperature acquired in step 703, is below the threshold S, then the control circuit 200 proceeds to a step 704 equivalent to step 603. In step 704 the control circuit 200 further resets the counter C to zero.

Otherwise, if the measurement M is above the threshold S, the control circuit 200 proceeds to step 701.

From step 704, the control circuit 200 proceeds to step 701.

In one variant of the invention FIG. 1 is considered without the sensor 190. In this variant, the control circuit 200 controls the switching device 180 according to a start-up cycle. When the control circuit 200 is powered then it closes the switching device 180. Thus, the heating device 140 is powered which heats the first battery 110. The control circuit 200 keeps the switching device 180 closed for a specified period. This period is, for example, 60 seconds, 90 seconds or 120 seconds. It could be shorter or longer. In a variant this period is recorded in a memory, not shown, of the control circuit 200.

An example of implementation is, for example, the case of a vehicle with a safety device on board that must be active as quickly as possible. In this case, said safety device is powered by a battery equipped with a device according to the invention. At the start-up of the vehicle the heating is therefore switched on for a period ensuring that the battery powering the safety device is at a temperature sufficient for enabling the operation of the safety device. After a specified period, the heating is switched off.

The invention claimed is:

1. A device for maintaining a first battery at an operating temperature, the device comprising:
a heating circuit suitable for heating the first battery; and
a control circuit comprising a selection device connected to the heating circuit,
the control circuit configured to control operation of the heating circuit in accordance with determined programming, comprising:
heating, powered by a second battery, the first battery as needed to enable a safety or security device of a vehicle to operate, wherein the selection device establishes, in response to being powered by the second battery, a first link for supplying power from the second battery to the heating circuit;
making a determination that the heating circuit is cut off from the second battery, and based on the determination: heating the first battery, electrically powered by the first battery,
wherein the selection device establishes, in response to the heating circuit being cut off from the second battery, a second link for supplying power from the first battery to the heating circuit.

2. The device as claimed in claim 1, further comprising:
a temperature sensor suitable for measuring the temperature of the first battery, said sensor being connected to the control circuit, the determined programming being based on a measurement of the temperature of the first battery.

3. The heating device as claimed in claim 1,
the selection device comprising a switching circuit for selecting the power supply of the heating circuit from the first battery, or the second battery.

4. The device according to claim 1, wherein the heating circuit is a winding of resistive cable arranged about the first battery.

5. The device according to claim 1, wherein the heating circuit is composed of two coils arranged on each side of a location intended to receive the first battery.

6. The device as claimed in claim 2, wherein the temperature sensor is thermally insulated from the heating circuit.

7. A method for implementing the device as claimed in claim 1, the method comprising:
at the start-up of the control circuit, switching on the heating circuit for a specified period.

8. A method for implementing the device as claimed in claim 1, the method comprising the steps of:
acquisition of the temperature of the first battery at a first predetermined frequency; and
comparison of the acquired temperature with a predetermined threshold; and
when the acquired temperature is below the threshold, switching on the heating circuit.

9. The method as claimed in claim 8, further comprising:
if, during the comparison the acquired temperature is above the threshold, then shutting down the heating circuit.

10. The method as claimed in claim 8, further comprising:
shutdown of the heating device at a second predetermined frequency.

* * * * *